United States Patent [19]

Chao et al.

[11] Patent Number: 4,822,492
[45] Date of Patent: Apr. 18, 1989

[54] LATEX POLYMER BONDED CRYSTALLINE MOLECULAR SIEVES

[75] Inventors: Chien C. Chao, Millwood; John D. Sherman, Chappaqua, both of N.Y.; Craig H. Barkhausen, Denville, N.J.

[73] Assignee: UOP, Des Plains, Ill.

[21] Appl. No.: 655,583

[22] Filed: Sep. 28, 1984

[51] Int. Cl.[4] .......................... B01D 15/00; C08J 9/32
[52] U.S. Cl. .................................... 210/679; 523/218; 521/25; 524/405; 524/413; 524/445; 524/430
[58] Field of Search ......................... 210/679; 523/218; 521/25; 524/405, 413, 445, 430

[56] References Cited

U.S. PATENT DOCUMENTS

| | | |
|---|---|---|
| 3,509,082 | 4/1970 | Mays et al. . |
| 3,916,062 | 10/1975 | Dougherty ........................ 523/218 |
| 4,096,081 | 6/1978 | Phenicie et al. . |
| 4,137,208 | 1/1979 | Elliott ................................ 523/218 |
| 4,175,976 | 11/1979 | Avera . |
| 4,230,593 | 10/1980 | Wagner, III et al. ............... 252/179 |
| 4,239,655 | 12/1980 | Inoue et al. . |
| 4,248,737 | 2/1981 | Kulprathipanja . |
| 4,261,941 | 4/1981 | Sherman et al. . |
| 4,295,994 | 10/1981 | Kulprathipanja . |
| 4,298,501 | 11/1981 | Kulprathipanja ................... 252/430 |
| 4,311,609 | 1/1982 | Wagner, III et al. . |
| 4,316,819 | 2/1982 | Tu et al. . |
| 4,319,928 | 3/1982 | Kulprathipanja et al. . |
| 4,333,768 | 6/1982 | Kulprathipanja et al. . |
| 4,333,769 | 6/1982 | Kulprathipanja et al. . |
| 4,337,171 | 6/1982 | Kulprathipanja et al. . |
| 4,363,672 | 12/1982 | Kulprathipanja . |
| 4,416,805 | 11/1983 | Kostinko ........................ 106/288 B |
| 4,431,456 | 2/1984 | Kulprathipanja . |
| 4,476,169 | 10/1984 | Nishino et al. ...................... 428/404 |

FOREIGN PATENT DOCUMENTS 48-091145 11/1973 Japan .
54-141822 11/1979 Japan .

OTHER PUBLICATIONS

Development of Charcoal Impregnation Process for CW Protective Overgarment, U.S. Army Natick Laboratories, Contract No. DA-19-129-AMC-675(N), Project No. 1M643303-D549, Jun. 25, 1965-Oct. 24, 1966.

Primary Examiner—Joseph L. Schofer
Assistant Examiner—N. Sarafim
Attorney, Agent, or Firm—Norman L. Balmer

[57] ABSTRACT

Adsorbent compositions are prepared by the addition of crystalline molecular sieves to latexes. The resulting latex polymer bonded zeolites have improved attrition resistance in separations involving an aqueous medium.

40 Claims, 3 Drawing Sheets

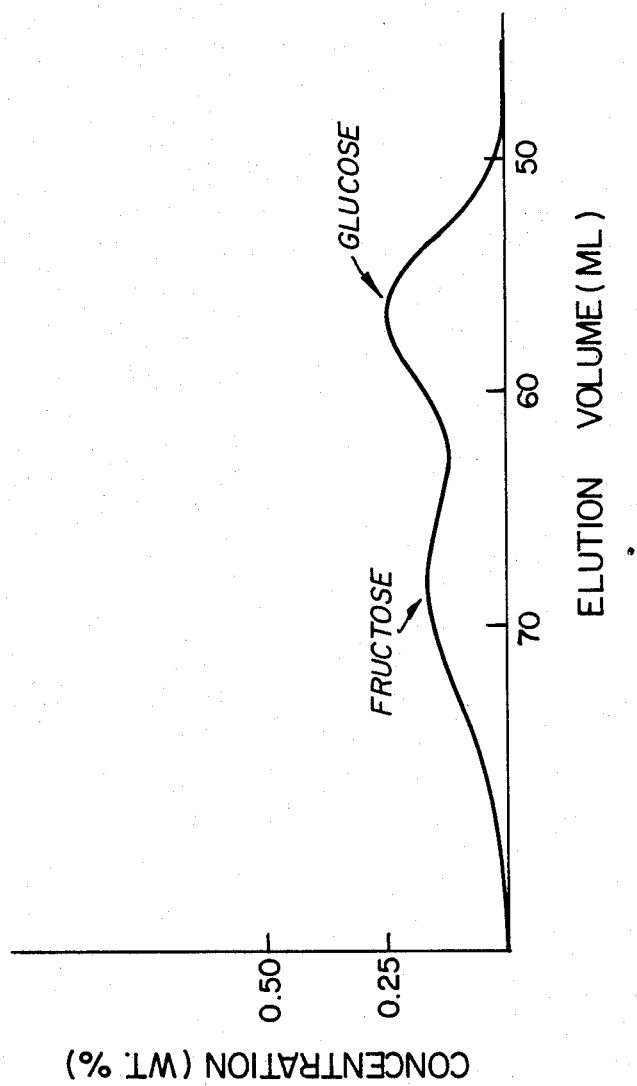

LATEX POLYMER BONDED CRYSTALLINE MOLECULAR SIEVES

FIELD OF THE INVENTION

The instant invention relates to latex polymer bonded crystalline molecular sieves, their preparation and to the use of such latex polymer bonded zeolites in adsorption and separation processes.

BACKGROUND OF THE INVENTION

The use of molecular sieves for the separation of a component from a mixture of that component and several others is generally known. Further, crystalline aluminosilicates, generally referred to as zeolites, have been employed for the separation of a component from an aqueous medium, e.g. U.S. Pat. No. 4,014,711 discloses the separation of fructose from a mixture of sugars.

Zeolite-containing adsorbents are traditionally employed in separation processes in the form of agglomerates. The agglomerates have been traditionally formed using inorganic binders such as clays, silicas and alumina. The agglomerates are generally formed by extrusion into cylindrical or bead shaped particles which are thermally treated at elevated temperatures to set the binder. Some zeolites are not stable at the temperatures required for binding with use of such inorganic oxide binders and, accordingly, may not be formed with inorganic oxide binders.

Unfortunately, zeolites which have been bonded with inorganic oxides have been observed to deteriorate when employed for separations involving aqueous media. The degradation of the adsorbent results in contamination of the component being separated and the aqueous medium with the degradation products of the adsorbent. Further, the finite lifetime of the adsorbent necessarily requires more frequent replacement of the adsorbent for achievement of a desired separation.

The inherent problems associated with zeolite bonded with inorganic oxides may be alleviated by replacement of the inorganic oxide binder with an organic polymer binder.

Several organic polymer binders have been reported in recent years, e.g. see: U.S. Pat. Nos. 4,239,655, 4,248,737, 4,295,994, 4,298,501, 4,316,819, 4,319,928, 4,333,768, 4,333,769, 4,337,711 and 4,363,672. U.S. Pat. No. 4,239,655 discloses zeolite bodies produced from a mixture of zeolite, polycarboxylic acid and water. U.S. Pat. No. 4,248,737 discloses adsorbents formed by mixing together powders of an organic polymer binder and a liquid organic solvent. U.S. Pat. No. 4,295,994 is similar to U.S. Pat. No. 4,248,737 with the organic polymer binder being cellulose acetate. U.S. Pat. No. 4,298,501 is similar to U.S. Pat. No. 4,295,994 with the organic solvent being acetic acid. U.S. Pat. No. 4,363,672 is similar to U.S. Pat. No. 4,295,994 and relates to a separation process employing the compositions prepared in U.S. Pat. No. 4,295,994. U.S. Pat. No. 4,319,928 discloses a process for the separation of a component from a feed mixture comprising an aqueous solution of a mixture of components by use of an adsorbent comprising a clay bound crystalline aluminosilicate dispersed in an organic matrix, wherein the adsorbent is coated with a water permeable organic polymer. U.S. Pat. Nos. 4,333,768 and 4,333,769 discloses processes for separating feed components in an aqueous stream by use of the adsorbent compositions coated with a cellulose ether. U.S. Pat. No. 4,337,171 discloses an adsorbent composition comprising a mixture of zeolite X or zeolite Y, from about 5.0 wt. percent to about 35.0 wt. percent of an alkali or alkaline earth exchange resin and from about 20.0 wt. percent to about 35.0 wt. percent of a water permeable organic polymer binder, wherein the weight ratio of zeolite X or zeolite Y to the exchange resin is from about 1.0 to about 3. The organic polymer binder is disclosed to be cellulose esters such as cellulose acetate and cellulose nitrate. U.S. Pat. No. 4,316,819 relates to a process for preparing a crystalline aluminosilicate adsorbent wherein a mixture of aluminosilicate, powdered binder, water permeable organic polymer and a liquid organic solvent are formed into spheres prior to removal of the liquid organic solvent to form the final spheroidal adsorbent particles. The spheroidal adsorbent particles prepared by the process are also claimed.

The aforementioned patents relating to various organic polymer binders are similar in that in each the crystalline aluminosilicate and organic polymer binder are mixed together in the presence of an organic solvent. The organic polymer binder in such instances does not form a free-flowing latex as in the instant invention. The use of organic polymer and organic solvent tends to require a high level of organic polymer binder to provide sufficient binder strength. This increase in the amount of organic polymer binder results in a decrease in the performance of the adsorbent composition. For example, in Table 2 of U.S. Pat. No. 4,248,737 the separation of certain sugars is disclosed for adsorbents employing the organic polymer binder cellulose acetate or similar cellulose polymers and the adsorbents employ from 17.5 to 39.4 wt. percent of the cellulosic polymers in adsorbent compositions. The chromatographic tests in Table 2 show that the fructose retention volume is only 55% to 83% of that of an adsorbent formed with a binder of 20% clay. Thus, a reduction in retention volume and accordingly the efficiency of the adsorbent resulted from the effect of the cellulosic ester binders.

The instant invention overcomes the problems associated with the polymer bonded zeolites heretofore disclosed by employing latexes to prepare bonded crystalline molecular sieves, preferably aluminosilicates, i.e., zeolites, for use as adsorbent compositions. The use of latex binders results in adsorbent compositions having not only improved resistance to attrition, and binding strength but also having retention volumes which are often equal to or better then clay bonded adsorbents. Further, the instant invention minimizes the tendency of the polymer binder to block the pores of the molecular sieve and avoids the high temperatures of formation that are harmful to some molecular sieves.

DESCRIPTION OF THE FIGURES

FIG. 3 shows an elution curve of a mixture of fructose and glucose where the adsorbent is a latex bonded calcium-substituted zeolite Y.

SUMMARY OF THE INVENTION

Figure 1:
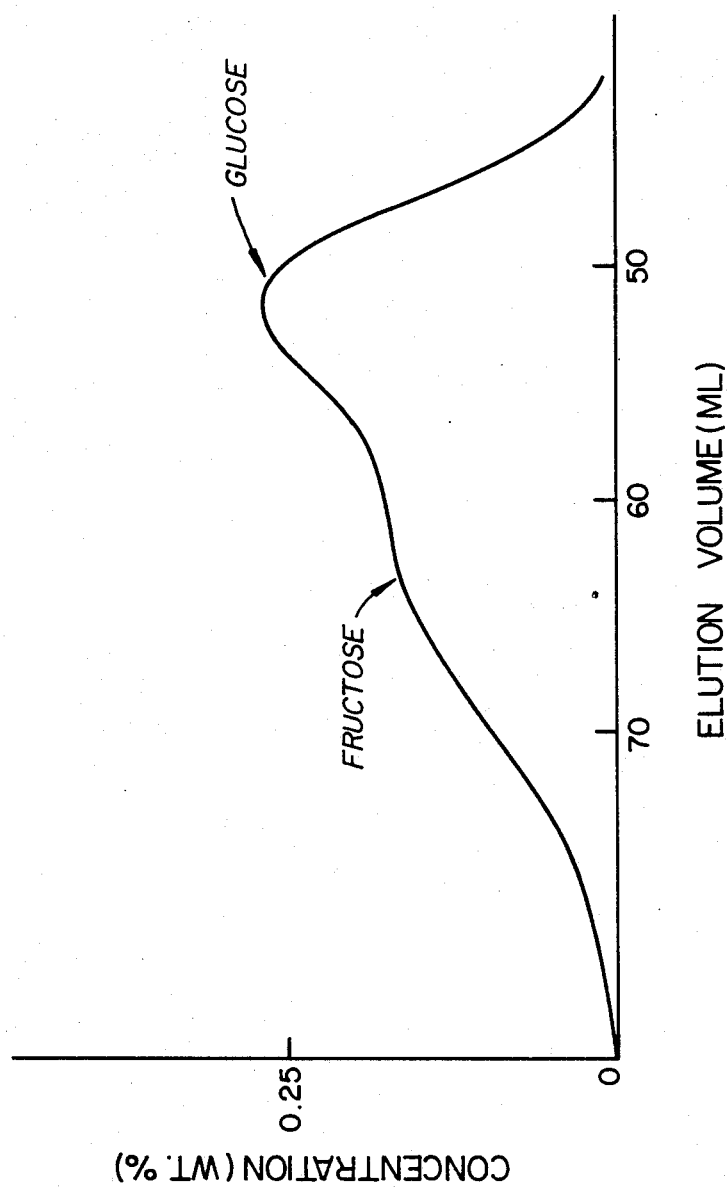
FIG. 1 shows an elution curve of a mixture of fructose and glucose where the adsorbent is a clay bonded calcium-substituted zeolite Y.

The instant invention relates to new adsorbent compositions comprising at least one crystalline molecular sieve and at least one latex polymer. The adsorbent compositions are useful in the separation of components from aqueous mixtures.

DETAILED DESCRIPTION OF THE INVENTION

The invention relates to latex-bonded crystalline molecular sieves, the process of their manufacture and to their use in separation processes. The invention is directed to adsorbent compositions for use in separations as heretofore carried out in the prior art. A compilation of certain of the important characteristics of such adsorbents is set forth at column 5, line 54 to column 7, line 11 of U.S. Pat. No. 4,295,994. As noted therein, adsorbent compositions should have selectivity for a given component to be separated and an adsorptive capacity for some volume of the component to be separated. In addition, the adsorbent should be resistant to degradation in the separation process (attrition resistance). The instant process is unique in that not only is the attrition resistance of the adsorbent increased but such has been observed to occur without the concurrent loss in capacity and selectivity heretofore associated with molecular sieves bonded with organic polymers dissolved in organic solvents.

The crystalline molecular sieve component (also referred to herein as the "molecular sieve") may be any crystalline inorganic molecular sieves, e.g., aluminosilicates, aluminophosphates, silicaluminophosphates, borosilicates, silicates and silicalite, employable for the separation of a component from a mixture of components. Representative of crystalline molecular sieves employable in the instant adsorbent compositions are aluminophosphates (e.g. U.S. Pat. No. 4,310,440) silicoaluminophosphates (e.g., the "SAPOs" of U.S. Pat. No. 4,440,871), zeolite X (U.S. Pat. No. 2,882,244), zeolite Y (U.S. Pat. No. 3,130,007), Zeolite A, zeolite F, zeolite, L, Zeolite P, zeolite Q, zeolite W, clinoptilolite, mordenite, chabazite, errionite, ZSM-type zeolites, NU-type zeolites, faujasite, phillipsite and mixtures thereof. The terms "ZSM-type" and "NU-type" are generally understood in the art of zeolites to refer to those zeolites denominated in the prior art by the designations "ZSM-n" and "NU-n" wherein in both instances "n" is an integer. Examples of ZSM-type zeolites are Nu-3, ZSM-5, ZSM-11, ZSM-12 and ZSM-48.

The crystalline molecular sieve is employed with a latex binder. The term "latexes" is used herein to generally refer to suspensions of polymer particles in water. These suspensions of polymer particles in water may have polymer particles up to 20 microns in diameter but are generally less than 10 microns in diameter. The use of latexes instead of the organic solvent based polymer systems of the prior art results in improved adsorbent compositions. Latexes having colloidal particles are generally described in the "Encyclopedia of Polymer Science and Technology", Interscience Publishers, New York (1968). The latex may be a natural latex or any synthetic latex homopolymer or interpolymer including unsaturated carboxylic acids, polyvinyl compounds (e.g. acetates), acrylics, polyolefins, alkylacrylates, polyvinylchlorides, phenolformaldehydes, epoxide polyesters, polycarbonates, polysulfones, cellulosics (e.g., cellulose carboxylates such as cellulose acetate, cellulose acetate butyrate, etc.), polyamides, silicones, thermoset plastics and mixtures thereof. Commercially available latexes include, but are not limited to, isoprene, styrene-butadiene, styrene-butadiene-acrylic acids, styrene-butadiene-vinylpyridine, methyl methacrylate-acrylic esters, vinylpyridine, methyl methacrylate-acrylate esters, butadiene-acrylonitrile, chloroprene-acrylonitrile, vinyl acetate, vinyl carboxylates other than acetate, vinylidene chloride-acrylonitrile, isobutylene-isoprene, and Bisphenol-A resol resins. Each designation of a latex type includes a large number of combinations, as is readily understood by one skilled in the art. For example, latexes employable herein include styrene-butadiene copolymers; styrene-butadiene-acrylic acid copolymers, containing from about 30 to about 60 percent of styrene, and from 1 to about 10 percent of acrylic acid; styrene-butadiene-vinylpyridine polymers, containing from about 15 to about 35 percent of styrene, and from about 5 to about 15 percent of vinylpyridine; methyl methacrylate-acrylic ester copolymers, containing from about 5 to about 50 percent of methyl methacrylate and terpolymers with acrylic or methacrylic acid; butadiene-acrylonitrile copolymers containing from about 30 to about 45 percent acrylonitrile; chloroprene-acrylonitrile copolymers containing 0 to about 15 percent of acrylonitrile; vinyl acetate-higher ester copolymers containing from about 50 to 100 percent of vinyl acetate and co- or terpolymers with acrylic or methacrylic acid; vinylidene chloride-acrylonitrile copolymers containing from about 5 to 15 percent of acrylonitrile; isobutylene-isoprene copolymers containing from about 3 to about 10 percent of isoprene; styrene-maleic anhydride copolymers; hydroxy acrylate and methacrylate copolymers and copolymers with acrylic acid, methacrylic acid, etc.; acrylic-styrene copolymers; acrylics and vinyl-acrylic interpolymers; acrylamide interpolymers. The above polymers can also contain varying amounts of crosslinking agents such as N-methylol acrylamide or epoxide resins. The acrylic latexes may have recurring molecular units indicated by the following formula:

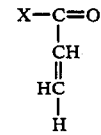

wherein X is selected from —OK, —ONa, —OH, —NH$_2$, —OCH$_2$NR$_2$, —OCH$_2$CH$_2$NR$_2$, —NHR and —NR$_2$, R is an alkyl radical having up to twelve carbon atoms.

Acrylic latexes are sold by Rohm and Haas Co., Philadelphia, PA, under the trademark RHOPLEX and by Union Carbide Corporation, Danbury, CT, under the trademark UCAR.

The latex is typically formed with a hydrophilic polymer having a particle size correlated to the particle size of the molecular sieve component. The molecular sieve and polymer particle sizes are typically less than 20 microns and desirably less than 10 microns. In most instances the particle size (diameter) of the polymer in the latex is desirably equal to about or less than the particle size of the molecular sieve. When the molecular sieve is employed in conjunction with an inorganic oxide binder, e.g., clays, silicas, aluminas, etc., the particles containing the binder and molecular sieve may be as large as 100 microns. In this instant the particle size of the polymer in the latex may be as large as permissible and yet maintain the polymer suspended in the latex by physical and/or chemical means. Representative procedures for the preparation of latexes are disclosed in U.S. Pat. Nos. 2,986,544, 3,823,103 and 3,862,060.

The latexes may optionally include components commonly found in latexes including stabilizers, preservatives, thickeners, antioxidants, softeners, stiffeners, tacifiers, fillers, vulcanizing agents, cross-linking agents and antifoaming agents. The use of stabilizing agents in latexes is quite common to maintain a stable dispersion. Stabilizers are surface active agents such as cationic surfactants, nonionic surfactants, anionic surfactants, fatty acid and disproportionated rosin soaps and may also be protective colloids such as starches, casein, glue, shellac, poly(vinyl alcohol), sodium polyacrylate and alkyl cellulose, just to name a few. The presence of such additional agents is not believed to be necessary in carrying out the instant inventions since the latex containing the suspended polymer particles and the molecular sieve may be blended within a relatively short period of time following preparation of the latter. Such a mixing procedure will tend to decrease the need for employing certain stabilizing additives. In some instances it may be desirable to add one or more water soluble salts, e.g., sodium chloride, etc., to the latex to modify the pore characteristics of the polymer in the final adsorbent. The exact effect of such salts on the final characteristics of the adsorbent compositions is not well understood at present.

The adsorbents of the instant invention may also contain inorganic oxides as binders, such as heretofore employed in forming aluminosilicate-containing adsorbent materials. Inorganic binder materials such as silicas, silica-aluminas, aluminas, titania, silica-zirconia, silica-magnesia, alumina-boria, aluminia-titania, clays (such as kaolin clays) and mixtures. The inorganic binder material may be present in an amount between 0 percent by weight and about 40 percent by weight, desirably up to about 30 percent by weight, based on the total weight of the molecular sieve and inorganic binder material. In the case of clay bonded molecular sieves, it is believed that 10 to 25 percent of the clay would be desirable, based on the total weight of the clay and molecular sieve.

The adsorbent compositions of the instant invention are formed from aqueous mixtures which contain at least one polymer and at least one molecular sieve. The polymer is present as suspended particles and may be present in an amount up to 65 weight percent, based on the total weight of water and polymer in the latex. The relative amount of polymer and molecular sieve component can vary such that the weight ratio of the polymer, exclusive of water, to the molecular sieve is between about 1:100 to about 1:1, desirably between abou 1:75 to about 1:2 and preferably between about 1:50 to about 1:10. In one embodiment the final adsorbent product comprises between about 1 and about 99.5 weight percent molecular sieve and between about 0.5 and about 10 weight percent of a latex polymer.

The adsorbent compositions of this invention may be generally employed for the separation of a component from a feed mixture comprising a solution of a mixture of components by contacting said solution with the adsorbent composition wherein the adsorbent exhibits selectivity towards said component to separate said component from said feed mixture. The selectively adsorbed component may be recovered thereafter. The compositions may also be employed for ion-exchange and other processes wherein selective separation is desired.

The absorbents of the instant invention are useful for the separation of mixtures of polar compounds including sugars, both disaccharides and monosaccharides, sugar alcohols, other carbohydrates, ketones, amino acids, etc. The adsorbents of the instant invention are well suited for the separation of the so called "simple sugars" which are classified as monosaccharides and are those sugars which upon hydrolysis do not break down into smaller simpler sugars. Monosaccharides may be further classified as aldoses or ketoses, depending upon whether they are hydroxy aldehydes or hydroxy ketones, and by the number of carbon atoms in the molecule. Most common and well known are the hexoses. Common ketohexoses are fructose (levulose) and sorbose; common aldohexoses are glucose (dextrose), mannose and galactose. The term "oligosaccharides," is commonly understood in the art and as used herein, means simple oligomers containing a known number of constituent monosaccharide units. An oligosaccharide that breaks up upon hydrolysis into two monosaccharide units is called a disaccharide, examples are sucrose, maltose and lactose. Those giving three such units are trisaccharides, of which raffinose and melezitose are examples. Di-, tri- and tetra-saccharides comprise practically all of the the oligosaccharides. The term "polysaccharide" includes oligosaccharides but usually it refers to carbohydrate materials of much higher molecular weight, namely, those that are capable of breaking up on hydrolysis into a large number of monosaccharide units. Typical polysaccharides are starch, glycogen, cellulose and pentosans.

Typical feed mixtures which may be separated by use of the adsorbents of this invention are, for example, aqueous solutions of one or more aldoses and one or more ketoses, or one or more monosaccharides and one or more oligosaccharides. The concentration of solids in such solutions may range from about 0.5 wt.% or more, but preferably will be from about 5 to about 75 wt.%. Starch syrups such as corn syrup are examples of feed mixtures which can be employed. Such syrups are produced by the partial hydrolysis of starch generally in the presence of mineral acids or enzymes. Corn syrup produced in this manner will typically contain 25 to 75 wt.% solids comprising 90 to 95% glucose and 5 to 10% maltose and higher oligosaccharides. A portion of the glucose in this corn syrup may be isomerized with an isomerizing enzyme to produce a high-frucose corn syrup, typically comprising 40-45% fructose, 50-55% glucose and 5-10% oligosaccharides, which can also be employed herein. The pH of the aqueous solution comprising the feed mixture is generally from about 4.0 to about 9.0, desirably from about 5.0 to 8.0.

Desorbent materials are generally employed in various prior art adsorptive separation processes for desorbing components from the adsorbent and vary depending upon such factors as the type of operation employed, e.g., liquid or vapor phase separation. In a swing-bed (vapor phase) system, in which the selectively adsorbed feed component is removed from the adsorbent by a purge stream, desorbent selection is not as critical and desorbent material comprising gaseous hydrocarbons such as methane, ethane, etc., or other types of gases such as nitrogen or hydrogen, may be used at elevated temperatures or reduced pressures or both to effectively purge the adsorbed feed component from the adsorbent. However, in adsorptive separation processes which are generally operated continuously at substantially constant pressures and temperatures to insure liquid phase, the desorbent material must be judiciously selected to satisfy many criteria. The selection of such desorbent materials is well known to those skilled in the art of vapor and liquid phase separations. It is contemplated that at least a portion of the desorbent material will be separated from the extract and the raffinate streams by fractional distillation or evaporation or crystallization, but other separation methods such as reverse osmosis may also be employed alone or in combination with distillation or evaporation. Desorbent materials include water, alcohols and mixtures thereof.

The adsorbents of this invention may be employed in the form of a dense compact fixed bed which may be alternatively contacted with the feed mixtures and desorbent materials. In the simplest embodiment of such separation processes the adsorbent is employed in the form of a single static bed in which case the process is only semi-continuous. Alternatively, a set of two or more static beds may be employed in fixed-bed contacting with appropriate valving so that the feed mixture is passed through one or more of the other beds in the set. The flow of feed mixture and desorbent materials may be either up or down through the adsorbent. Any of the conventional apparatus employed in static bed fluid-solid contacting may be used. The adsorbent compositions of the instant invention may be employed in any of the gas, liquid, super critical fluid processes generally employable for the separation of feed components based on the selectivity of an adsorbent for certain of the feed components.

Counter-current moving-bed or simulated moving-bed counter-current flow systems, have been observed to have a much greater separation efficiency than fixed adsorbent bed systems and are therefore generally preferred for use in many separation processes. In moving-bed or simulated moving-bed processes the adsorption and desorption operations are continuously taking place which allows both continuous production of an extract and a raffinate stream and the continual use of feed and desorbent streams. Such a process may also utilize a simulated moving-bed counter-current flow system. The operating principles and sequence of which a flow system are described in U.S. Pat. No. 2,985,589 incorporated herein by reference thereto. In such a system, it is the progressive movement of multiple liquid access points down an adsorbent chamber that simulates the upward movement of adsorbent contained in the chamber. Only four of the access lines are active at any one time; the feed input stream, desorbent inlet stream, raffinate outlet stream, and extract outlet stream access lines. Coincident with this simulated upward movement of the solid adsorbent is the movement of the liquid occupying the void volume of the packed bed or adsorbent. So that counter-current flow is maintained, a liquid flow down the adsorbent chamber may be provided by a pump. As an active liquid access point moves through a cycle, that is, from the top of the chamber to the bottom, the chamber circulation pump moves through different zones which require different flow rates. A programmed flow controller may be provided to set and regulate these flow rates.

Although both liquid and vapor phase operations can be used in many adsorptive separation processes, liquid-phase processes are often employed for the separation of aqueous streams because of the lower temperature requirements and because of the higher yields of extract product that can be obtained with liquid-phase operation over those obtained with vapor-phase operation. Adsorption conditions for such liquid-phase processes will include a temperature range of from about 20° C. to about 200° C. with about 20° C. to about 100° C. being more preferred and a pressure range of from about atmospheric (zero (0) psig.) to about 500 psig., with from about atmospheric to about 250 psig. being more preferred to insure liquid phase operation. Desorption conditions will include the same range of temperatures and pressures as used for adsorption conditions.

Th size of the units which can utilize the process of this invention can vary anywhere from those of pilot-plant scale to those of commercial scale and can range in flow rates from as little as a few cubic centimeters an hour up to many thousands of gallons per hour.

The following examples are presented to illustrate the instant invention and are not intended to unduly restrict the scope and spirit of the claims attached hereto.

EXPERIMENTAL PROCEDURE

The adsorbents discussed hereinafter were evaluated by carrying out the separation of fructose from glucose by use of a pulse test. This test consisted of packing a column with the selected adsorbent, placing it in a block heater to maintain constant temperature and eluting sugar solutions through the column with water to determine the retention volume of a feed component. The resolution factor "R" was defined in terms of the retention volume, the peak width as follows:

$$R = 2 \frac{V_a - V_b}{W_a + W_b}$$

wherein "$V_a$" is the retention volume of peak A, "$V_b$" is the retention volume of peak B, "$W_a$" is the half width of peak A and "$W_b$" is the half width of peak B. The retention volume of component A as represented by peak A is defined as the elution volume of the component minus the "void volume". The "void volume" is the volume of water needed (desorbent) to elute a non-sorbing component through the column of adsorbent. Inulin was selected as the non-sorbing component. The half width of a peak is the elution volume difference at the half-height of the peak. The resolution factor is a parameter which characterizes the ability of an adsorbent to separate two components. An adsorbent with a higher "R" value for a given feed component provides a better separation of that component.

The adsorbents were also evaluated for physical strength, i.e., attrition resistance by placing 10 grams (30×50 U.S. Standard Mesh) in a 4 ounce bottle containing 30 grams of water. The bottle was placed on a paint shaker for 20 minutes. The adsorbent mixture was then filtered and the amount of solids (fines) passing through a 100 mesh (U.S. Standard) sieve determined. Adsorbents having superior attrition resistance have correspondingly smaller amounts of fines.

The "pulse test" employed in the following examples comprised placing 4.5 cubic inches of a 30×50 mesh (U.S. Standard) adsorbent in a 63 inch stainless steel column (0.3 inch ID). The column was filled with water and maintained at a temperature of 160° F. The feed was then switched to a mixture which contained 2 percent fructose by weight and 2 percent glucose by weight in water and then pumped through the column at a flow rate of 1 milliliter/minute (0.57 gpm/ft$^2$) or 2 milliliters/minute (1.06 gpm/ft$^2$) for a period of one minute or 0.5 minute, respectively. Water was then employed as the desorbent at the selected flow rate. The composition of the effluent from the column was monitored by a differential refractometer. The elution volume, peak widths and resolution factor were determined for each adsorbent tested.

EXAMPLE 1

A clay bonded zeolite Y (calcium form) was prepared containing 20 weight percent (wt. %) bentonite and 80 wt. % of the zeolite Y.

EXAMPLE 2

(a) A latex bonded NaY adsorbent was prepared according to this invention by placing 757.6 grams of the sodium form of zeolite Y (Loss on Ignition (LOI)=21%) in a Hobart mixer (Model N-50). To the NaY was added 78.8 grams of a Bisphenol-A resin latex (solid content of 40 wt. percent) mixed with 360 milliliters of water. The latex is sold by Union Carbide Corporation under the product designation BKUA 2392 and is a phenolic-epoxy containing an epoxide resin as a crosslinking agent. BKUA 2392 is a latex formed with a phenolic epoxy resin containing 62 percent volatiles by volume and a specific gravity of 1.09. The NaY and latex were mixed until the LOI of the mixture was reduced to 41 percent as determined by an Ohaus moisture instrument. The resulting granules were placed in a tray and heated in an oven in air at 150° C. for 16 hours. The product was cooled and ground to a 30×50 mesh size (U.S. Standard).

(b) A portion of the 30×50 mesh size product was ion exchanged with 1M CaCl$_2$ at 90° C. by using a four fold cation excess (over the total ion exchange capacity of the Y zeolite) in a column, based on the crystalline Y zeolite. This product was then washed with ethanol at 70° C. to remove residual monomers of the latex from the adsorbent product.

EXAMPLE 3

(a) A latex bonded NaY adsorbent was prepared according to this invention. The adsorbent was prepared by placing 378.8 grams of NaY (sodium form of zeolite Y), having an LOI of 21 percent, in a Hobart mixer (Model N-50) and slowly adding thereto 35.0 grams of a Bisphenol-A resin latex in 190 grams of water. This latex is sold by Union Carbide Corporation under the product designation BKUA-2370. BKUA-2370 is a phenolic crosslinkable aqueous dispersion containing 45% total solids. BKUA-2370 is described in Product Information Sheet F-47050 entitled "BAKELITE(TM) Phenolic Dispersion BKUA-2370", published by Union Carbide Corporation, Danbury, Conn. The resulting mixture was mixed until the LOI of the mixture was reduced to 40 percent as determined by an Ohaus moisture instrument. The resulting granules were placed in a tray and heated in an oven in air at 150° C. for 16 hours. The product was cooled and ground to a 30×50 mesh size (U.S. Standard).

(b) A portion of the 30×50 mesh product of part (a) was ion exchanged with 1M CaCl$_2$ at 90° C. by using a four fold cation excess (over the total cation exchange capacity of the Y zeolite) in a column, based on the crystalline Y zeolite. This product was then washed with ethanol at 70° C. to remove residual monomers of the latex from the adsorbent product.

EXAMPLES 4-6

Figure 2:
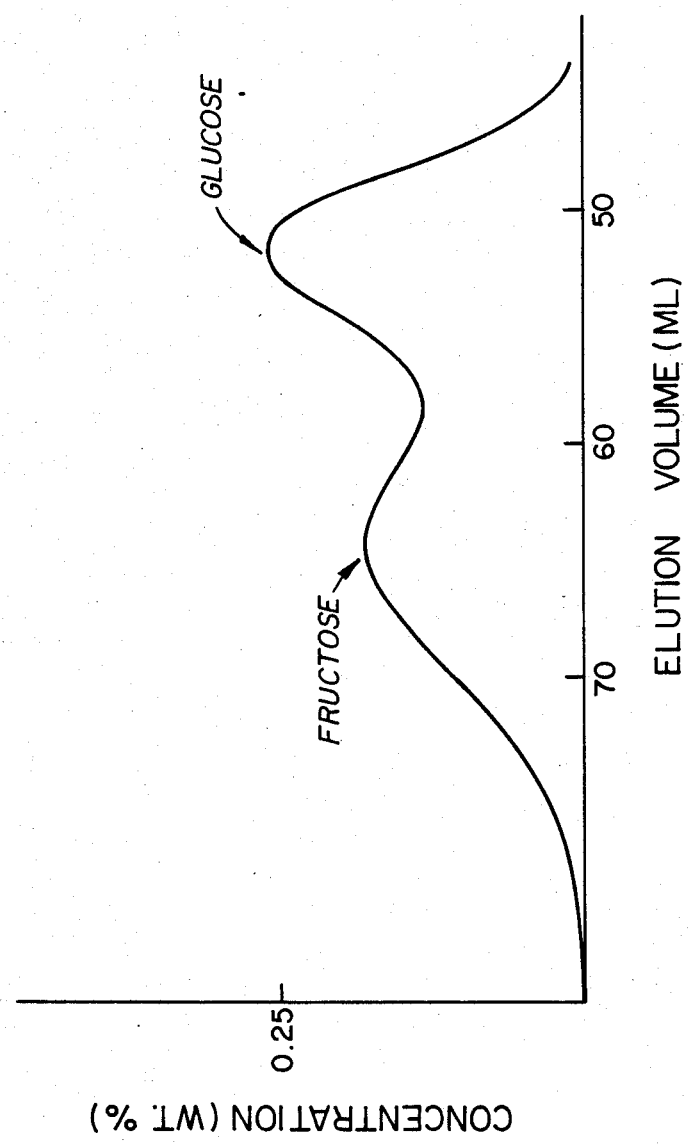
FIG. 2 shows an elution curve of a mixture of fructose and glucose where the adsorbent is a latex bonded calcium-substituted zeolite Y.

The products of examples 1, 2(b) and 3(b) were evaluated in examples 4, 5 and 6, respectively for the separation of fructose and glucose by the pulse test described in the experimental procedure. Table I sets forth the void volume, retention volumes, half widths and resolution factors for the separation. The flow rate of the feed injection and desorbent water was 2 milliliters/minute and the feed injection was for a period of 1 minute for the concentration profiles depicted in FIGS. 1, 2 and 3. FIG. 1 shows the concentration profile of the effluent when the adsorbent of example 1 was employed. FIG. 2 shows the concentration profile of the effluent when the adsorbent of example 2(b) was employed. FIG. 3 shows the concentration profile of the effluent when the adsorbent of example 3(b) was employed. A comparison of examples 4, 5 and 6 demonstrate the improved adsorbent characteristics of adsorbent compositions prepared according to the invention.

TABLE I[1]

| Example | Flow Rate (gpm/ft$^2$) | V$_I$ | W$_I$ | V$_F$ | W$_F$ | V$_G$ | W$_G$ | R$_F$ |
|---|---|---|---|---|---|---|---|---|
| 4 | 1.06 | — | — | 62.0 | 17.2 | 51.6 | 9.8 | 0.77 |
|   | 0.53 | 47.7 | 11.6 | 65.0 | 12.8 | 52.7 | 7.6 | 1.21 |
|   | 0.27 | — | — | 67.8 | 9.1 | 54.2 | 6.2 | 1.78 |
| 5 | 1.06 | — | — | 64.6 | 14.6 | 50.9 | 8.4 | 1.19 |
|   | 0.53 | 51.0 | 10.2 | 65.6 | 10.6 | 51.3 | 7.1 | 1.62 |
|   | 0.27 | — | — | 66.7 | 8.3 | 52.1 | 5.6 | 2.1 |
| 6 | 1.06 | — | — | 64.3 | 13.4 | 51.8 | 7.8 | 1.18 |
|   | 0.53 | 9.2 | 7.6 | 63.7 | 10.1 | 51.1 | 6.6 | 1.51 |
|   | 0.27 | — | — | 68.8 | 8.1 | 54.7 | 5.6 | 2.06 |

[1]The headings in the table are defined as follows:
V$_I$ = elution volume of inulin
W$_I$ = peak half-width of inulin
V$_F$ = elution volume of fructose
W$_F$ = peak half-width of fructose
V$_G$ = elution volume of glucose
W$_G$ = peak half-width of glucose $$R_F = \text{resolution factor of fructose} = R_F = 2\frac{V_F - V_G}{W_F - W_G}$$

EXAMPLES 7-9

The adsorbents of examples 1, 2(a) and 3(a) for tested, respectively, in examples 7, 8 and 9 for attrition resistance by the procedure described in the Experimental Procedure. The results of these tests are set forth in Table II below with a lower attrition value representing an adsorbent with better attrition resistance. The adsorbent compositions of this invention demonstrate improved attrition resistance over clay bonded adsorbent compositions.

TABLE II

| Example | Attrition Value |
|---|---|
| 7 | 24.6 |
| 8 | 20.7 |
| 9 | 14.5 |

We claim:
1. An aqueous composition for the preparation of an adsorbent composition for the separation of polar components from aqueous solutions, said aqueous composition comprising a weight ratio of latex polymer, based on the weight of the polymer in the latex, to crystalline molecular sieve between about 1:100 to about 1:1.
2. The composition of claim 1 wherein the latex polymer is selected from the group consisting of polyvinylacetate, acrylics, polyolefins, polyvinylchlorides, phe- nolformaldehydes, epoxide polyesters, polycarbonates, polysulfones, polyamides, silicones, cellulose carboxylates and mixtures thereof.

3. The composition of claim 1 wherein the latex polymer is a thermoset plastic.

4. The composition of claim 1 wherein the latex polymer is an epoxy resin, a polyolefin, a polyester, an acrylic or a phenolic resin.

5. The composition of claim 1 wherein the crystalline molecular sieve is selected from the group consisting of aluminophosphates, silicoaluminophosphates, silicate, zeolite X, zeolite Y, zeolite A, zeolite F, zeolite L, zeolite P, -type zeolite Q, -type zeolite W, clinoptilolite, mordenite, chabazite, errionite, ZSM-type, NU-type, faujasite, phillipsite and mixtures thereof.

6. The composition of claim 5 wherein the crystalline molecular sieve is at least one of zeolite A, X, Y and faujasite.

7. The composition of claim 5 wherein the crystalline molecular sieve is selected from the group consisting of zeolite F, zeolite W and mixtures thereof.

8. The composition of claim 5 wherein the molecular sieve is selected from the group consisting of zeolite X and zeolite Y.

9. The composition of claim 5 wherein the crystalline molecular sieve contains cations at exchangeable cationic sites selected from the group consisting of alkali metals, alkaline earth metals, rare earth metals, metals of Groups IIB to IVB and mixtures thereof.

10. The composition of claim 1 wherein said composition comprises a weight ratio of polymer to crystalline molecular sieve between about 1:50 and about 1:10.

11. The composition of claim 1 wherein said composition contains between about 1 and about 30 weight percent of an inorganic oxide binder other than said crystalline molecular sieve based on the total weight of said molecular sieve and inorganic oxide binder, wherein the inorganic oxide binder is selected from the group consisting of silica, alumina, silica-alumina, titania, silica-zirconia, silica-magnesia, alumina-boria, alumina-titania, clays and mixtures thereof.

12. The method for the manufacture of adsorbent compositions comprising at least one crystalline molecular sieve and at least one latex polymer which comprises: adding at least one crystalline molecular sieve to a particulate latex polymer in water to provide a mixture containing a weight ratio of latex polymer, based on the weight of the polymer in the latex, to crystalline molecular sieve between about 1:100 to about 1:1; forming a mixture of said crystalline molecular sieve, latex polymer and water; drying the mixture by removing substantially all the water from said mixture; and breaking the dried mixture to produce particles of desired size.

13. The method of claim 12 wherein said polymer is an aqueous dispersion of at least one polymer selected from the group consisting of polyvinylacetate, acrylics, polyolefins, polyvinylchlorides, phenolformaldehydes, epoxide polyesters, polycarbonates, polysulfones, polyamides silicones, cellulose carboxylates and mixtures thereof.

14. The method of claim 12 wherein said latex polymer is a dispersion of at least one polymer selected from the group consisting of phenolic resins, polyesters and acrylics.

15. The method of claim 12 wherein the crystalline molecular sieve is selected from the group consisting of aluminophosphate, silicoaluminophosphate, zeolite X, zeolite Y, zeolite A, zeolite L, zeolite P, zeolite Q, zeolite W, clinoptilolite, mordenite, chabazite, errionite, faujasite, phillipsite, ZSM-type zeolite, NU-type zeolite and mixtures thereof.

16. The method of claim 15 wherein said molecular sieve is selected from the group consisting of zeolite A, zeolite X and zeolite Y.

17. The method of claim 15 wherein said crystalline molecular sieve contains cations at exchangeable cation sites selected from the group consisting of alkali metals, alkaline earth metals, rare earth metals metals of Groups IIB to IVB and mixtures thereof.

18. The method of claim 12 wherein said at least one inorganic oxide other than said crystalline molecular sieve is present with said crystalline molecular sieve and said polymer, wherein said inorganic oxide is selected from the group consisting of silica, alumina, silica-alumina, titania, silica-zicronia, silica-magnesia, alumina-boria, alumina-titania, clays and mixtures thereof.

19. The method of claim 12 wherein the weight ratio of said polymer to said crystalline molecular sieve is between about 1:100 and about 1:1.

20. The method of claim 15 wherein said process comprises:
(a) preparing a mixture of a latex comprising an aqueous dispersion of at least one polymer selected from the group consisting of polyvinylacetates, acrylics, polyolefins, polyvinylchlorides, phenolformaldehydes, epoxide polyesters, polycarbonates, polysulfones, polyamides, silicones, cellulose carboxylates and mixtures thereof and a crystalline molecular sieve wherein the weight ratio of said polymer to said crystalline molecular sieve is between about 1:50 and about 1:10;
(b) forming said mixture into discrete formations;
(c) removing water from said formations to produce dry formations; and
(d) breaking said dry formation to produce particles of desired size.

21. A process for the separation of a component from a feed mixture comprising an aqueous solution of a mixture of components by contacting said solution with an adsorbent composition wherein said adsorbent exhibits selectivity towards said component to separate said component from said feed mixture and thereafter recovering said selectively adsorbed component wherein said adsorbent composition is prepared from an aqueous composition comprising a weight ratio of latex polymer, based on the weight of the polymer in the latex, to crystalline molecular sieve between about 1:100 to about 1:1.

22. The process of claim 21 wherein said adsorbent contains a molecular sieve selected from the group consisting of zeolite X, zeolite Y and mixture thereof and at least one polymer selected from the group consisting of polyvinylacetate, acrylics, polyolefins, polyvinylchlorides, phenolformaldehydes, epoxide polyesters, polycarbonates, polysulfones, polyamides, silicones, cellulose carboxylates and mixtures thereof.

23. The process of claim 21 wherein said adsorbent is prepared by the steps of:
(a) preparing a mixture of a latex comprising an aqueous dispersion of at least one polymer selected from the group consisting of polyvinylacetate, acrylics, polyolefins, polyvinylchlorides, phenolformaldehydes, epoxide polyesters, polycarbonates, polysulfones, polyamides, silicones, cellulose carboxylates and mixtures thereof and a crystalline molecular sieve from 0 weight of polymer to molecular sieve is between 1:100 to about 1:1;

(b) forming said mixture into discrete formations;

(c) removing water from said formations to produce dry formations; and (d) breaking said hard dry formations to produce particles of desired size.

24. The process of claim 23 wherein said polymer and crystalline molecular sieve have particle diameters less than about 20 microns.

25. The process of claim 24 wherein said polymer and crystalline molecular sieve have particle diameters less than about 10 microns.

26. The process of claim 21 wherein said latex is an aqueous dispersion of at least one polymer selected from the group consisting of polyvinylacetate, acrylics, polyolefins, polyvinylchlorides, phenolformaldehydes, epoxide polyesters, polycarbonates, polysulfones, polyamides, silicones, cellulose carboxylates and mixtures thereof.

27. The process of claim 23 wherein said adsorbent composition is prepared by:

(a) preparing mixtures of a latex comprising an aqueous dispersion of at least one polymer selected from the group consisting of polyvinylacetates, acrylics, polyolefins, polyvinylchlorides, phenolformaldeydes, epoxide polyesters, polycarbonates, polysulfones, polyamides, silicones, cellulose carboxylates and mixtures thereof and a crystalline molecular sieve wherein the weight ratio of said polymer to said crystalline molecular sieve is between about 1:50 and about 1:10;

(b) forming said mixture into discrete formations;

(c) removing water from said formations to produce dry formations; and (d) breaking said dry formation to produce particles of desired size.

28. The process of claim 21 wherein said aqueous solution comprises a mixture of polar compounds selected from the group consisting of at least one of monosaccharides, disaccharides, sugar alcohols and ketones.

29. The process of claim 28 wherein said polar compounds are selected from the group consisting of at least one of monosaccharides and disaccharides.

30. The process of claim 29 wherein said polar compounds comprise glucose and fructose.

31. The process of claim 21 wherein said adsorbent composition comprises an adsorbent formed from a mixture containing between about 1 and about 99.5 weight percent crystalline molecular sieve, between about 0.5 and about 10 weight percent of a polymer derived from a latex, wherein the amount of latex polymer is based on the weight of the polymer and between 0 and about 40 weight percent of and inorganic oxide binder.

32. The process of claim 21 wherein said adsorbent composition comprises an adsorbent formed from a mixture containing a weight ratio of latex, based on the weight of the polymer in said latex, to crystalline molecular sieve between about 1:75 and about 1:2.

33. The process of claim 32 wherein said adsorbent composition comprises an adsorbent formed from a mixture containing a weight ratio of latex, based on the weight of the polymer in said latex, to crystalline molecular sieve between about 1:50 and about 1:10.

34. The process of claim 21 wherein the crystalline molecular sieve is at least one selected from the group consisting of aluminosilicates, silicoaluminophosphates and silcates.

35. The process of claim 34 wherein the crystalline molecular sieve is at least one aluminosilicate selected from the group consisting of zeolite X, Zeolite Y, Zeolite A, Zeolite F, Zeolite L, Zeolite P, Zeolite Q, Zeolite W, clinoptilolite, mordenite, chabazite, errionite, ZSM-type zeolites, NU-type zeolites, faujasite and philipsite.

36. The process of claim 35 wherein the crystalline molecular sieve is at least one aluminosilicate selected from the group consisting of zeolite X, Zeolite Y, Zeolite A and faujasite.

37. The process of claim 36 wherein the crystalline molecular sieve is at least one aluminosilicate selected from the group consisting of zeolite X, Zeolite Y and faujasite.

38. The process of claim 35 wherein the aluminosilicate contains cations at exchangeable cationic sites selected from the group consisting of alkali metal, alkaline, earth metal, rare earth and metals of Groups IIB to IVB.

39. The process of claim 31 wherein said inorganic oxide binder is selected from the group consisting of silica, alumina, silica-alumina, titania, silica-zirconia, silica-magnesia, alumina-boria, alumina-titania and clays.

40. A process according to claim 21 for the separation of a component from a feed mixture comprising an aqueous solution of a mixture of components by contacting said solution with an adsorbent wherein said adsorbent exhibits selectivity towards said component to separate said component from said feed mixture and thereafter recovering said selectively adsorbed component wherein said adsorbent is prepared by:

(a) preparing a mixture of a latex comprising an aqueous dispersion of at least one water insoluble polymer and at least one crystalline molecular sieve wherein the weight ratio of said polymer, exclusive of water, to said crystalline molecular sieve is between about 1:50 and about 1:10;

(b) forming said mixture into discrete formations;

(c) removing water from said formations to produce dry formations; and (d) breaking said dry formation to produce particles of desired size.

* * * * *